Patented Apr. 2, 1946

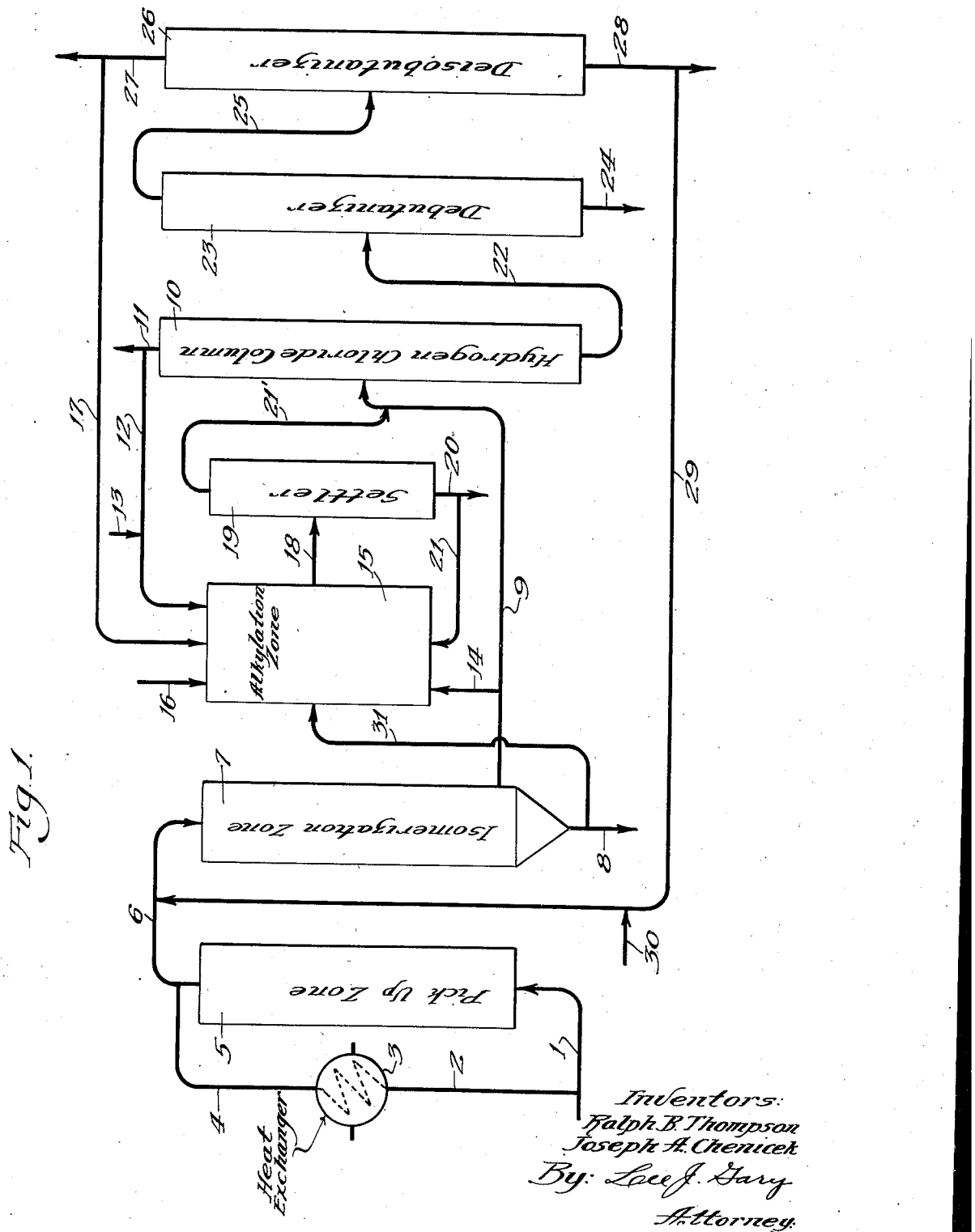

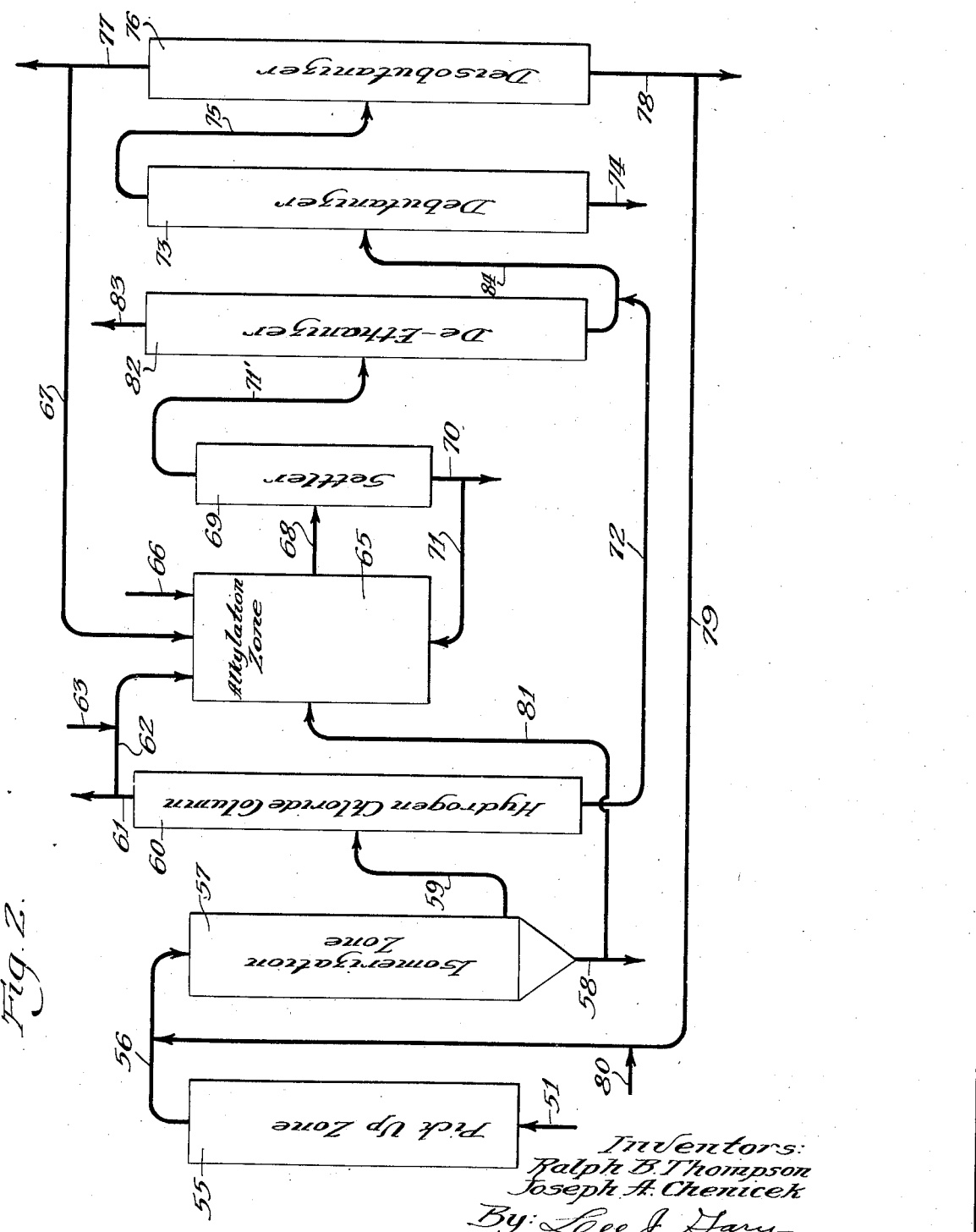

2,397,820

UNITED STATES PATENT OFFICE 2,397,820

TREATMENT OF HYDROCARBONS

Ralph B. Thompson and Joseph A. Chenicek, Riverside, Ill., assignors to Universal Oil Products Company, Chicago, Ill., a corporation of Delaware Application November 5, 1943, Serial No. 509,022

7 Claims. (Cl. 260—683.4)

This is a continuation-in-part of our co-pending application Serial No. 504,462 filed September 30, 1943.

This invention relates to the treatment of hydrocarbons and more particularly to a novel combination of a series of cooperative and mutually dependent steps wherein a normal paraffinic hydrocarbon is isomerized in the presence of a catalyst and a promoter to produce an isoparaffinic hydrocarbon and the isoparaffinic hydrocarbon is alkylated by ethylene to produce normally liquid branched chain hydrocarbons.

Since ethylene is not readily available in a pure form and since the separation of ethylene from ethane is a complicated procedure, it is necessary from a commercial point of view to utilize ethylene-ethane fractions as the source of ethylene. The exact proportions of ethylene and ethane in the mixture will vary with their method of production and recovery. In any event, when a mixture of ethylene and ethane is charged to an alkylation process utilizing a catalyst comprising a metal halide of the Friedel-Crafts type and hydrogen chloride, an ethane-hydrogen chloride fraction will be separated from the other products. The separation of hydrogen chloride from ethane in order to permit recycling of the hydrogen chloride to the alkylation zone, is a difficult and costly procedure.

We have discovered that under suitable conditions substantially all of the hydrogen chloride charged to the alkylation system reacts with ethylene to produce ethyl chloride. The separation of the ethyl chloride from the ethane is now a simple matter. The ethyl chloride, however, forms an azeotrope with normal butane and we have further discovered that this azeotropic mixture may satisfactorily be used as the catalyst promoter in the isomerization reaction when effected in the presence of a metal halide catalyst of the Friedel-Crafts type. At atmospheric pressure the azeotrope of ethyl chloride and normal butane contains approximately 12 to 13 mol per cent of ethyl chloride and has a boiling point almost identical with that of pure normal butane.

In a broad aspect the present invention relates to a hydrocarbon conversion process in which an isomerizable paraffin hydrocarbon is isomerized in the presence of an isomerizing catalyst and an ethyl chloride-normal paraffin azeotrope, and the resultant isoparaffin is alkylated with ethylene in the presence of an alkylation catalyst in an alkylation zone to which hydrogen chloride is introduced.

In one specific embodiment the present invention relates to a hydrocarbon conversion process in which normal butane is isomerized in the presence of a metal halide catalyst of the Friedel-Crafts type and a catalyst promoter comprising an ethyl chloride-normal butane azeotrope formed during a subsequent alkylation step. The isobutane produced during said isomerization is alkylated in the presence of a metal halide catalyst of the Friedel-Crafts type and a catalyst promoter comprising hydrogen chloride formed during said isomerization.

In a more specific embodiment the present invention relates to a hydrocarbon conversion process in which normal butane is isomerized in the presence of aluminum chloride and a catalyst promoter comprising an ethyl chloride-normal butane azeotrope formed during a subsequent alkylation step, the products of said isomerization being separated into a hydrogen chloride-containing fraction, an isobutane-containing fraction and a normal butane-containing fraction, the normal butane-containing fraction being recycled to said isomerization for further conversion therein, and said isobutane-containing fraction and said hydrogen chloride-containing fraction are supplied, together with ethylene, to an alkylation zone, wherein the isobutane is alkylated by the ethylene in the presence of an aluminum chloride catalyst.

The novel combination of the present invention offers many important advantages for the isomerization and alkylation reactions. In the first place, it avoids the complicated and costly procedure of separating hydrogen chloride from ethane. Secondly, it substantially reduces, if not completely eliminates, the use of added hydrogen chloride in the isomerization step of the process by utilizing the ethyl chloride-normal butane azeotrope, the azeotrope being used as such and therefore does not require extraneous means to decompose it prior to use in the isomerization reaction. Still another important feature of the present process is the unitary system in which the products of both the isomerization and the alkylation reaction may be subjected to separation in the same fractionating zones, thereby avoiding the necessity of extra fractionating means together with the concomitant increased original installation and subsequent operation costs.

In a broad aspect the normal paraffinic hydrocarbon may comprise any isomerizable normal paraffin including normal butane, normal pentane, normal hexane, etc., but the invention is particularly applicable to the treatment of normal butane for isomerization into isobutane and subsequent alkylation with ethylene to produce 2,3-dimethylbutane which is very valuable for use in aviation gasoline and other purposes. In the interest of simplicity the following description will be directed to the isomerization of normal butane, it being understood that the conditions of operation may have to be modified accordingly if other isomerizable hydrocarbons are utilized.

Although the catalyst may comprise a metal halide of the Friedel-Crafts type, it preferably comprises aluminum chloride and the following description of the invention will be limited thereto. It is understood that the exact conditions of operation may have to be modified if other catalysts are utilized in place of the aluminum chloride.

The term "aluminum chloride" as used in this specification and appended claims is intended to include aluminum chloride per se, aluminum chloride supported on various relatively inert carriers, aluminum chloride composited with other catalytic materials such as other metal halides, and aluminum chloride hydrocarbon complexes.

The invention will be further explained in connection with the attached diagrammatic flow drawings comprising Figures 1 and 2. Figure 1 illustrates one embodiment of the invention while Figure 2 illustrates another embodiment of the invention.

Referring to Figure 1 of the drawings, a normal butane-containing fraction is introduced to the process through line 1. It is preferred that the normal butane fraction be as free from other constituents as is practical, although usually it will contain other constituents and particularly isobutane. A portion of the butane charging stock may be directed through line 2 into and through heat exchanger 3 or other suitable heating means, wherein the butane stream is heated to the desired temperature which generally will be within the range of from about 100 to about 350° F. The heated butane stream is then directed into line 4. Another portion of the butane charging stock is directed through line 1 into pick-up zone 5, which contains aluminum chloride. Zone 5 is preferably maintained at a temperature within the range of from about 100 to about 300° F. and preferably of from about 150 to about 250° F. Although vapor phase conditions may prevail in this zone, it is preferred that the material therein be maintained under sufficient pressure to keep the same in substantially liquid phase and this pressure is usually within the range of from about 50 to 600 pounds or more. In order to obtain the desired temperature conditions in zone 5, the butane charging stock introduced thereto may be preheated by well known means not illustrated prior to introduction into zone 5 or by any other suitable heating means.

The butane stream introduced into zone 5 will carry over aluminum chloride and the mixture is then removed from zone 5 through line 6, wherein it is commingled with the separately heated butane stream from line 4 as well as with an ethyl chloride-normal butane azeotrope supplied thereto in the manner to be hereinafter described, and the mixture is then supplied into isomerization zone 7.

Zone 7 may be of any suitable design for effecting the desired reaction and thus may comprise a packed or unpacked zone which may or may not contain baffles or other contacting means.

Zone 7 is normally maintained at a temperature within the range of from about 50 to about 350° F. and preferably of from about 175 to about 275° F. at the same or lower pressure as heretofore described for zone 5. Any sludge or hydrocarbon-aluminum chloride complex may be withdrawn continuously or periodically from the lower portion of zone 7 through line 8, while the reaction products are withdrawn from zone 7 through line 9. The isomerization process illustrated in the drawings is of the type now known in the art as "two-tube." However, it is understood that a single zone or any other suitable isomerization process may satisfactorily be employed.

During the isomerization reaction, a portion of the ethyl chloride-normal butane azeotrope will undergo decomposition to form hydrogen chloride, and the products withdrawn from zone 7 through line 9 will comprise isobutane, unconverted normal butane, hydrogen chloride, ethyl chloride, along with other constituents. In one embodiment of the invention these products may be supplied through line 9 to hydrogen chloride column 10.

In hydrogen chloride column 10, the hydrogen chloride is separated from the higher boiling material and the former is withdrawn from the upper portion of zone 10 through line 11 and may be removed from the process but, in accordance with the present invention, at least a portion thereof is directed by way of line 12 to the alkylation step of the process as will hereinafter be described in detail. Line 13 is provided for the introduction of hydrogen chloride during the starting up of the process or as make-up hydrogen chloride when required. As heretofore set forth, the ethylene fraction used in the alkylation process will usually contain ethane and the hydrogen chloride fraction withdrawn from the upper portion of zone 10 will therefore contain ethane. Since the ethane is unconverted in the alkylation step of the process, it must be removed in order to avoid its building up within the system. If the ethane content is low, its removal may be sufficiently accomplished by removing from the process a portion of the overhead fraction withdrawn from zone 10 through line 11. However, if the ethane content is too high, a preferred method of removing the same is illustrated in Figure 2 of the drawings.

In another embodiment of the invention, the reaction products from isomerization zone 7 may be directed from line 9 through line 14 into alkylation zone 15. An ethylene-containing fraction is introduced to zone 15 through line 16. Isobutane recycled within the process is supplied to zone 15 by way of line 17.

Zone 15 may comprise an alkylation zone of any suitable type for effecting the alkylation of isobutane with ethylene in the presence of an aluminum chloride catalyst. If the catalyst comprises granular aluminum chloride or supported aluminum chloride, zone 15 will usually comprise a fixed bed of the solid catalyst, through which the reactants are passed under alkylation conditions of temperature, pressure, space velocity, etc. If the catalyst consists of a fluid aluminum chloride-hydrocarbon complex, zone 15 will comprise suitable equipment such as a mechanically agitated reaction zone, a jet mixer, time tank provided with internal baffles and/or orifices, etc. The alkylation reaction is usually effected at a temperature of from about 50 to about 170° F. and preferably of from about 100 to about 140° F. under sufficient pressure to maintain at least a portion of the reactants in liquid phase. It is desirable to maintain an excess of isobutane over ethylene in the hydrocarbon charge to the alkylation step of from about 4:1 to about 20:1.

As heretofore set forth, the hydrogen chloride introduced to alkylation zone 15 is substantially completely converted to ethyl chloride by reaction with a portion of the ethylene feed. The ethyl chloride forms an azeotrope with normal butane. The azeotrope is formed in the alkylation zone if normal butane is present or, if not, the azeotrope is formed in one of the fractionating zones of the system. The alkylation products are withdrawn from zone 15 through line 18 and are supplied to settler 19, wherein a hydrocarbon layer is separated from a catalyst layer when the catalyst is employed in the form of an aluminum chloride-hydrocarbon complex. The catalyst layer may be withdrawn through line 20 and may be removed from the process or at least a portion thereof may be recycled by way of line 21 to zone 15 for further use therein.

The hydrocarbon layer is withdrawn from zone 19 through line 21' and is supplied by way of line 9 into hydrogen chloride column 10, wherein a hydrogen chloride fraction, which usually contains ethane, is separated and withdrawn from the upper portion thereof for treatment in the manner heretofore described. The bottoms fraction from zone 10 will comprise products boiling above hydrogen chloride and ethane from both the isomerization and alkylation processes and thus will contain excess isobutane, ethyl chloride, normal butane and/or the azeotrope, and alkylate. This bottoms fraction is directed through line 22 to debutanizer 23.

In zone 23 the alkylate is separated from isobutane, ethyl chloride, normal butane and/or the azeotropic mixture thereof. The alkylate is withdrawn from the lower portion of zone 23 through line 24 and may be further fractionated to separate 2,3-dimethylbutane from other constituents by well known means not illustrated. The overhead from zone 23 is directed through line 25 to deisobutanizer 26. The exact composition of this stream will depend upon the amount of normal butane contained in the original butane charging stock as well as the amount of hydrogen chloride introduced to alkylation zone 15 for forming ethyl chloride. In any event, an overhead stream comprising isobutane is separated in zone 26 and withdrawn therefrom through line 27, wherefrom all or a portion thereof may be removed from the process but preferably at least a portion thereof is supplied by way of line 17 to alkylation zone 15 for conversion in the manner heretofore described. The bottoms product from zone 26 is withdrawn through line 28 and may be removed from the process but, in accordance with the present invention, at least a portion thereof is directed by way of lines 29 and 6 to isomerization zone 7 for use and treatment in the manner heretofore described. Line 30 is provided for the addition of hydrogen chloride at the starting of the process and also for make-up hydrogen chloride if required.

We have also found that the aluminum chloride hydrocarbon complex formed during the isomerization reaction may show little or no activity to catalyze further isomerization but is still capable of catalyzing the alkylation of isobutane by ethylene. It is therefore within the scope of the invention to utilize all or a portion of the complex withdrawn from the lower portion of isomerization zone 7 through line 8 in alkylation zone 15 and this may be accomplished by directing the same through line 31 to zone 15.

Figure 2 of the drawings illustrates another specific embodiment of the invention and differs from Figure 1 primarily by the additional provision of means to remove ethane from the process. As heretofore mentioned, this embodiment of the invention is preferred when the ethane content introduced to the process is high. It also differs from Figure 1 in introducing the total butane charging stock direct to the pick-up zone rather than utilizing a split feed type of operation.

Referring to Figure 2 of the drawings, the butane charging stock at a suitable temperature and pressure is introduced to the process through line 51 into pick-up zone 55, from which the mixture of butane and aluminum chloride is passed through line 56 into isomerization zone 57. The hydrocarbon complex formed in zone 57 may be withdrawn therefrom through line 58 and may be removed from the process or all or a portion thereof may be directed through line 81 into alkylation zone 65. The isomerization reaction products are directed through line 59 to hydrogen chloride column 60, wherefrom a hydrogen chloride-ethane fraction is separated and removed through line 61. All or a portion thereof may be withdrawn from the process but preferably at least a portion thereof is directed through line 62 into alkylation zone 65. Line 63 is similarly provided for the introduction of hydrogen chloride from an extraneous source if required.

An ethylene-containing fraction is introduced to alkylation zone 65 through line 66 and isobutane is introduced thereto by way of line 67. The alkylation products are directed through line 68 to settler 69, wherefrom the catalyst sludge may be withdrawn through line 70 or recycled to zone 65 by way of line 71.

The hydrocarbon layer from settler 69 is directed through line 71' to de-ethanizer 82. In this embodiment of the invention, the hydrocarbon layer withdrawn from the upper portion of settler 69 will not contain hydrogen chloride since the hydrogen chloride has been substantially completely converted into ethyl chloride. The ethane may therefore readily be separated and withdrawn from the process and this may be accomplished by removing the same through line 83 from the upper portion of de-ethanizer 82. If propane or other undesired low-boiling constituents are also present, the operation of zone 82 may be modified accordingly to remove these undesired components in the overhead stream.

The bottoms product from zone 82 is then withdrawn by way of line 84 and commingled with the bottoms product which is withdrawn through line 72 from hydrogen chloride column 60, and the mixture may be introduced to debutanizer 73, wherefrom the alkylate is withdrawn through line 74 and the overhead fraction is withdrawn through line 75 and supplied to deisobutanizer 76. Isobutane is withdrawn through line 77 and at least a portion thereof is recycled by way of line 67, while the bottoms product from zone 76 is withdrawn therefrom through line 78 and at least a portion thereof is recycled by way of lines 79 and 56 to isomerization zone 57. Line 80 is provided for the introduction of hydrogen chloride to the isomerization step of the process if required.

In view of the similarity between Figures 1 and 2, the numerals assigned to the various lines and zones in Figure 2 are fifty numbers higher than similar equipment in Figure 1. It is also to be noted, in the interest of simplicity, that pumps, valves and similar appurtenances have been omitted from the drawings.

The following example is introduced to further illustrate the novelty and utility of the present invention but not with the intention of unduly limiting the same.

A butane charging stock containing 98.5% normal butane and 1.5% pentanes is isomerized in the presence of an aluminum chloride catalyst and 8.6 mol per cent of ethyl chloride present as an azeotrope with normal butane in a two-tube operation as described, employing a temperature of 170° F. in the pick-up zone and 219° F. in the isomerization zone. The reaction products per pass consisted of 30% isobutane and 67% of normal butane and ethyl chloride including the azeotropic mixture thereof.

The isobutane is separated from a fraction containing the normal butane-ethyl chloride azeotrope and any excess normal butane. The latter fraction is recycled to the isomerization zone, while the isobutane is subjected to alkylation at a temperature of 140° F. and a pressure of 250 pounds per square inch in the presence of an aluminum chloride catalyst and the hydrogen chloride formed by decomposition of the ethyl chloride-normal butane azeotrope, which decomposition may comprise about 30% of the azeotropic mixture introduced into the isomerization zone.

The alkylate produced in the process as heretofore described may amount to more than 250% by weight based upon the ethylene charged to the process.

We claim as our invention:

1. A hydrocarbon conversion process which comprises subjecting normal butane to isomerization in an isomerizing zone in the presence of a metal halide catalyst of the Friedel-Crafts type to convert a portion of the normal butane into isobutane, supplying admixed isobutane and normal butane from said zone to an alkylating zone, introducing ethylene and hydrogen chloride to the alkylating zone and therein reacting a portion of the ethylene with isobutane in the presence of a metal halide catalyst of the Friedel-Crafts type, reacting another portion of the ethylene with hydrogen chloride in the alkylating zone, thereby forming ethyl chloride, removing the resultant reaction products and unconverted normal butane from the alkylating zone and separating from the effluent mixture an azeotrope of ethyl chloride and normal butane and supplying said azeotrope to the isomerizing zone.

2. A hydrocarbon conversion process which comprises subjecting normal butane to isomerization in an isomerizing zone in the presence of an aluminum chloride catalyst to convert a portion of the normal butane into isobutane, supplying admixed isobutane and normal butane from said zone to an alkylating zone, introducing ethylene and hydrogen chloride to the alkylating zone and therein reacting a portion of the ethylene with isobutane in the presence of an aluminum chloride catalyst, reacting another portion of the ethylene with hydrogen chloride in the alkylating zone, thereby forming ethyl chloride, removing the resultant reaction products and unconverted normal butane from the alkylating zone and separating from the effluent mixture an azeotrope of ethyl chloride and normal butane, and supplying said azeotrope to the isomerizing zone.

3. The process as defined in claim 2 further characterized in that hydrogen chloride is formed in the isomerizing zone from the ethyl chloride content of said azeotrope and supplied to the alkylating zone.

4. The process as defined in claim 2 further characterized in that aluminum chloride-hydrocarbon complex formed in the isomerizing zone is supplied to the alkylating zone.

5. The process as defined in claim 2 further characterized in that the products from the isomerizing zone and said effluent mixture from the alkylating zone are fractionated in admixture to separate said azeotrope and a hydrogen chloride-containing gas and at least a portion of the latter introduced to the alkylating zone.

6. In a hydrocarbon conversion process wherein normal butane is isomerized in the presence of a Friedel-Crafts metal halide catalyst and resultant isobutane subjected, in admixture with unconverted normal butane, to alkylation with ethylene in a reaction zone, the improvement which comprises introducing hydrogen chloride to said zone and therein reacting the same with ethylene to form ethyl chloride, separating from the products of the alkylating step an azeotrope of ethyl chloride and normal butane and supplying said azeotrope to the isomerizing step.

7. In a hydrocarbon conversion process wherein normal butane is isomerized in the presence of an aluminum chloride catalyst and resultant isobutane subjected, in admixture with unconverted normal butane, to alkylation with ethylene, and hydrogen chloride introduced to the alkylating step whereby ethyl chloride is formed in situ, the method which comprises separating from the products of the alkylating step an azeotrope of ethyl chloride and normal butane, supplying said azeotrope to the isomerizing step and therein liberating hydrogen chloride from the ethyl chloride content of the azeotrope, and supplying thus liberated hydrogen chloride to the alkylating step.

RALPH B. THOMPSON.
JOSEPH A. CHENICEK.